(12) United States Patent
Gawryla et al.

(10) Patent No.: US 8,845,937 B2
(45) Date of Patent: Sep. 30, 2014

(54) POROUS MATERIAL HAVING ANISOTROPIC STRUCTURE AND METHOD OF MAKING THE SAME

(75) Inventors: Matthew D. Gawryla, Chagrin Falls, OH (US); David A. Schiraldi, Shaker Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 13/377,576

(22) PCT Filed: Jun. 14, 2010

(86) PCT No.: PCT/US2010/038476
§ 371 (c)(1),
(2), (4) Date: Dec. 12, 2011

(87) PCT Pub. No.: WO2010/144899
PCT Pub. Date: Dec. 16, 2010

(65) Prior Publication Data
US 2012/0098152 A1    Apr. 26, 2012

Related U.S. Application Data

(60) Provisional application No. 61/268,316, filed on Jun. 11, 2009.

(51) Int. Cl.
*B29C 35/02* (2006.01)
*B01J 13/00* (2006.01)

(52) U.S. Cl.
CPC .................................. *B01J 13/0091* (2013.01)
USPC .......................................................... 264/28

(58) Field of Classification Search
USPC .......................................................... 264/28
See application file for complete search history.

(56) References Cited

U.S. PATENT DOCUMENTS

| 2,093,454 | A | 9/1937 | Kistler |
| 3,188,264 | A | 6/1965 | Holden |
| 3,203,903 | A | 8/1965 | van Olphen |
| 4,925,603 | A | 5/1990 | Nambu |
| 5,176,108 | A | 1/1993 | Jenkins et al. |
| 5,214,012 | A | 5/1993 | Suzuki et al. |

(Continued)

FOREIGN PATENT DOCUMENTS

| GB | 1 313 091 | 4/1973 |
| JP | 63159269 A | 7/1988 |

(Continued)

OTHER PUBLICATIONS

Gawryla et al. ("Anisotropic Clay Aerogel Composite Materials" Mater. Res. Soc. Symp. Proc., vol. 1188, 2009).*

(Continued)

*Primary Examiner* — Larry Thrower
(74) *Attorney, Agent, or Firm* — Renner, Otto, Boisselle & Sklar, LLP

(57) ABSTRACT

A method of forming an anisotropic porous material includes forming an aerogel precursor, the aerogel precursor including a matrix material and a liquid dispersion medium for dispersing the matrix material. The aerogel precursor is frozen so that the dispersion is solidified while controlling the direction of crystal growth within the aerogel precursor. The aerogel precursor is freeze dried to sublime the dispersion medium and form the porous material.

16 Claims, 8 Drawing Sheets

(56) References Cited

U.S. PATENT DOCUMENTS

| | | | |
|---|---|---|---|
| 5,347,950 | A | 9/1994 | Kasbo et al. |
| 5,503,111 | A | 4/1996 | Hughes |
| 5,526,771 | A | 6/1996 | Ito |
| 5,622,693 | A | 4/1997 | Funatsu |
| 5,801,116 | A | 9/1998 | Cottrell et al. |
| 5,975,019 | A | 11/1999 | Goss et al. |
| 5,992,351 | A | 11/1999 | Jenkins |
| 6,013,391 | A | 1/2000 | Le et al. |
| 6,027,795 | A | 2/2000 | Kabra et al. |
| 6,083,619 | A | 7/2000 | Frank et al. |
| 6,262,162 | B1 | 7/2001 | Lan et al. |
| 6,287,550 | B1 | 9/2001 | Trinh et al. |
| 6,811,602 | B2 | 11/2004 | Beppu et al. |
| 6,863,924 | B2 | 3/2005 | Ranganathan et al. |
| 6,887,570 | B2 | 5/2005 | Greene et al. |
| 7,119,137 | B2 | 10/2006 | Darlington et al. |
| 7,544,720 | B2 | 6/2009 | Cooper et al. |
| 7,691,911 | B2 | 4/2010 | Lee et al. |
| 2004/0033352 | A1 | 2/2004 | Massa et al. |
| 2004/0132846 | A1 | 7/2004 | Leventis |
| 2004/0173536 | A1 | 9/2004 | Coronado et al. |
| 2005/0005869 | A1 | 1/2005 | Fritter et al. |
| 2005/0146066 | A1 | 7/2005 | Koide et al. |
| 2005/0175577 | A1 | 8/2005 | Jenkins et al. |
| 2005/0266992 | A1 | 12/2005 | Ohno et al. |
| 2006/0211840 | A1 | 9/2006 | Lee |
| 2007/0208124 | A1 | 9/2007 | Schiraldi et al. |
| 2008/0132632 | A1 | 6/2008 | Schiraldi et al. |
| 2009/0035344 | A1 | 2/2009 | Thomas et al. |

FOREIGN PATENT DOCUMENTS

| | | | |
|---|---|---|---|
| JP | 09238588 | A | 9/1997 |
| JP | 11079860 | A | 3/1999 |
| JP | 11188253 | A | 7/1999 |
| JP | 11347401 | A | 12/1999 |
| KR | 2008 093 772 | A | 10/2008 |
| WO | 03/093197 | | 11/2003 |
| WO | 2004/087285 | | 10/2004 |
| WO | 2008/121069 | | 10/2008 |
| WO | 2010/029517 | | 3/2010 |
| WO | 2010/144802 | | 12/2010 |
| WO | 2010/144803 | | 12/2010 |
| WO | 2010/144807 | | 12/2010 |
| WO | 2010/144896 | | 12/2010 |

OTHER PUBLICATIONS

Gohil et al., "Studies on the Cross-linking of Poly(Vinyl Alcohol)", Journal of Polymer Research, No. 13, 2006, pp. 161-169.

International Search Report and the Written Opinion for International Application No. PCT/US2010/038470 mailed Feb. 15, 2011 corresponding to copending U.S. Appl. No. 13/377,574.

Nishihara et al., "Preparation of resorcinol-formaldehyde carbon cryogel microhoneycombs", Letters to the Editor, Carbon 42, 2004, pp. 889-901.

Wang et al., "Comparison of porous poly (vinyl alcohol)/hydroxyapatite composite cryogels and cryogels immobilized on poly (vinyl alcohol) and polyurethane foams for removal of cadmium", Journal of Hazardous Materials, vol. 156, 2008, pp. 381-386.

Kathuria et al., "Synthesis and characterization of elastic and macroporous chitosan-gelatin cryogels for tissue engineering", Acta Biomaterialia, vol. 5, 2009, pp. 406-418.

Petrov et al., "Synthesis of biodegradable hydroxyethylcellulose cryogels by UV irradiation", Polymer 48, 2007, pp. 4943-4949.

International Search Report and the Written Opinion for corresponding International Application No. PCT/US2010/038476 mailed Feb. 23, 2011.

Gawryla et al., "Anisotropic clay Aerogel Composite Materials", Materials Research Society Symp. Proc., vol. 1188, 2009, 6 pages.

Materials Research Society, MRS Meeting Archives—2009 Spring Meeting—Symposium LL: Architectured Multifunctional Materials, 2009, 7 pages.

Hostler et al., "Thermal conductivity of a clay-based aerogel", International Journal of Heat and Mass Transfer, vol. 52, 2009, pp. 665-669.

Nishihara et al., "Preparation of titania-silica cryogels with controlled shapes and photocatalysis through unidirectional freezing", Materials Letters, vol. 64, 2010, pp. 959-961.

International Search Report and the Written Opinion for International Application No. PCT/US2010/038323 mailed Feb. 18, 2011, corresponding to copending U.S. Appl. No. 13/377,577.

Gawryla et al., "Clay aerogel/cellulose whisker nanocomposites: a nanoscale wattle and daub", Journal of Materials Chemistry, vol. 19, 2009, pp. 2118-2124.

Pojanavaraphan et al., "Prevulcanized natural rubber latex/clay aerogel nanocomposites", European Polymer Journal, vol. 44, 2008, pp. 1968-1977.

Finlay et al., "Biologically Based Fiber-Reinforced/Clay Aerogel Composites", Ind. Eng. Chem. Res., vol. 47, 2007, pp. 615-619.

Griebel et al., "Clay aerogel supported metallic nanoparticles for the purpose of liquid and gas phase hydrogenation", Internet http://filercase.edu/users/jjg34/Preprint%20ACS%_20Spring%202009.pdf, 2008, 2 pages.

Griebel et al., "Clay Aerogel Supported Palladium Nanoparticles as Catalysts", Internet http://filer.case.edu/users/jjg34/Jared%20Catalyst%20Paper%20Version@206.1 PDF.pdf 2008, 10 pages.

Somlai et al., "Facile Processing of Clays into Organically-Modified Aerogels", American Institute of Chemical Engineers, vol. 52, 2006, pp. 1162-1168.

International Preliminary Report on Patentability for International Application No. PCT/US2010/038323 mailed Aug. 10, 2011, corresponding to copending U.S. Appl. No. 13/377,577.

International Search Report and the Written Opinion for International Application No. PCT/US2010/038317 mailed Feb. 24, 2011, corresponding to copending U.S. Appl. No. 13/377,580.

International Search Report and the Written Opinion for International Application No. PCT/US2010/038316 mailed Oct. 25, 2010, corresponding to copending U.S. Appl. No. 13/377,581.

Jeon et al., "Method for preparing permanently hydrophobic aerogel powder with increased particle size and density", Chemical Abstracts Service, 2008, 1 page.

Paakko et al., "Long and entangles native cellulose I nanofibers allow flexible aerogels and hierarchically porous templates for functionalities", Soft Matter, vol. 4, 2008, pp. 2492-2499.

Mitsutoshi et al., "Preparation of aromatic polyamide aerogels by supercritical fluid extraction with carbon dioxide", Internet http://sciencelinks.jp/j-east/article/200212/000020021202A0213691.php, 2001, 1 page.

Reynolds et al., "Hydrophobic aerogels for oil-spill clean up—synthesis and characterization", Journal of Non-Crystalline Solids, vol. 292, 2001, pp. 127-137.

Ikkala et al., "Solid state nanofibers based on self-assemblies: from cleaving from self-assemblies to multilevel hierarchical constructs", Faraday Discussions, vol. 143, 2009, pp. 95-107.

International Preliminary Report on Patentability for International Application No. PCT/US2010/038316 mailed Sep. 27, 2011, corresponding to copending U.S. Appl. No. 13/377,581.

Tsuda et al., "A hairpin-loop conformation in tandem repeat sequence of the ice nucleation protein revealed by NMR spectroscopy", FEBS Letters 409, 1997, pp. 227-231.

Graether et al., "Modeling Pseudomonas *syringae* Ice-Nucleation Protein as a β-Helical Protein", Biophysical Journal, vol. 80, 2001, pp. 1169-1173.

International Preliminary Report on Patentability for International Application No. PCT/US2010/038317 mailed Dec. 9, 2011, corresponding to copending U.S. Appl. No. 13/377,580.

International Preliminary Report on Patentability for corresponding International Application No. PCT/US2010/038476 mailed Dec. 9, 2011.

Miller et al., "Notes Random Powder Mounts From Montmorillonite Aerogels", Clay Minerals, 1070, 8, pp. 347-348.

Machine translated English equivalent of JP 11347401 A, 14 pages.

JP 63159269 A as abstracted by CAPlus (AN 1989:12491), 1 page.

(56) References Cited

OTHER PUBLICATIONS

Definition of freeze-drying, Hawley's Condensed Chemical Dictionary, 14th Edition, © 2002, John Wiley & Sons, Inc., 1 page.
Machine translated English equivalent of JP 11188253 A.
Abstract of Hsu, "Effect of Yam (Dioscorea elate Compared to Dioscorea japonica) on Gastrointestinal Function and Antioxidant Activity in Mice", Journal of Food Science, 2006, 71, S513-S516.
Machine translated English equivalent of JP 09238588 A.
Machine translated English equivalent of JP 11079860 A.
Kistler, "Coherent Expanded Aerogels", J. Phys. Chem. 1932; 36; pp. 52-64.
Mackenzie, "Clay-water Relations", Nature, 1952: 171; pp. 681-683.
Call, "Preparation of Dry Clay-Gels by Freeze-Drying", Nature 1953: 172; 126.
Norrish et al., "Effect of Freezing on the Swelling of Clay Minerals", Clay Miner, bulletin 1962; 5; pp. 9-16.
van Olphen, "Polyelectrolyte Reinforced Aerogels of Clays-Application as Chromatographic Adsorbents", Clay Miner, 1967; 15; pp. 423-345.
Nakazawa et al., "Texture Control of Clay-Aerogel through the Crystallization Process of Ice", Clay Science 1987; 6; pp. 269-276.
Schiraldi et al., "Facile Processing of Clays into Organically-Modified Aerogels", AICHE Journal 093002, Revised Sep. 1, 2005, pp. 1-27.
Schiraldi et al., "Temperature-Responsive Clay Aerogel Polymer composites", Presented at Case Western Reserve University, Sep. 9, 2005, pp. 1-19.
Schiraldi et al., "Clay Aerogel Nanocomposites, 'AeroClay", Clay Aerogel Business Proposal, Sep. 15, 2005, pp. 1-5.
Bandi et al., "Responsive Polymer/Clay Aerogel Composites", MRS 204 Presentation, Nov. 24, 2004, 1 page.
Schiraldi, "Clay Aerogel/Polymer Composites", Schiraldi Research Group, Case Western Reserve University, SPE Online, Sep. 28, 2005.
Schiraldi et al., "Polymer/Clay Aerogel Composites", American Chemical Society 228th National Meeting & Exposition, Aug. 22-26, 2004, Philadelphia, PA, p. 32.
Bandi et al., "Clay Aerogel Polymer Composites", American Chemical Society, Mar. 8, 2005, 26 pages.
Schiraldi, "Tailoring Polymer Properties Using Well-Designed Nanofillers", Presented at Ferro Corporation Meeting Mar. 29, 2005, 33 pages.
Schiraldi, "Clay Aerogel/Polymer Composites", presented at ANTEC, Boston, MA, May 4, 2005, 40 pages.
Schiraldi, "New Fillers for FR Plastics", presented at Delphi Packard Electric Meeting, Jun. 23, 2005, 30 pages.
Schiraldi, "Polymer/Aerogel Composites for Lightweighting Applications", presented to Honda, Aug. 2, 2005, 37 pages.
Schiraldi, "Case Aerogel Program", presented at NASA Meeting, Jul. 5, 2005, 28 pages.
International Preliminary Report on Patentability for International Application No. PCT/US2010/038470 mailed Nov. 14, 2011 corresponding to copending U.S. Appl. No. 13/377,574.

* cited by examiner

POROUS MATERIAL HAVING ANISOTROPIC STRUCTURE AND METHOD OF MAKING THE SAME

RELATED APPLICATION DATA

This application is a national phase of International Application No. PCT/US2010/038476 filed Jun. 14, 2010 and published in the English language, which claims priority to U.S. 61/268,316 filed Jun. 11, 2009.

TECHNICAL FIELD

The present application relates generally to aerogels, and in particular to anisotropic aerogels produced by directionally controlling the freezing process of an aerogel precursor.

BACKGROUND

A gel by definition is a sponge like, three-dimensional solid network whose pores are filled with another substance, such as a liquid. The liquid of the gel is not able to diffuse freely from the gel structure and remains in the pores of the gel. But when the gel is subjected to a drying process, the liquid may be removed from the network, thereby leaving the solid network behind.

Drying the gel using conventional drying techniques results in formation of a xerogel. A xerogel is a solid formed from drying a gel with unhindered shrinkage. The associated shrinkage of the solid network associated with conventional drying techniques is caused by capillary forces acting on the pore walls as the liquid evaporates, and such shrinkage generally results in the destruction of the initial solid network. Xerogels are generally characterized as having a porosity of about 30% and in some embodiments, may have a specific surface area of about 500 m$^2$/g.

By contrast, drying the gel using a supercritical drying or freeze drying process can yield an aerogel. An aerogel is a porous solid that is formed from a gel, in which the liquid that fills the pores of the solid has been replaced with a gas. Aerogels are generally produced by drying the gel either by a supercritical drying or by freeze drying. Shrinkage of the gel's solid network during drying is negligible or all-together prevented due much in part to the minimization of capillary forces acting on the network as the liquid is expended.

Aerogels are generally characterized as having high porosity (about 94-98%), and high specific surface area. Aerogels also possess relatively low densities, generally in the range of 0.004-0.5 g/cm$^3$. Aerogels generally possess excellent load bearing properties and insulation properties, and may be used as a catalyst or in connection with a catalytic process (e.g., as a catalyst support structure).

SUMMARY OF INVENTION

The subject matter of the present application provides an anisotropic porous material (i.e., an aerogel) having mechanical properties such as increased strength in one direction. The anisotropic porous material in accordance with the present application may also functions as a gas barrier.

Numerous different articles can be prepared containing the aerogel material. The articles listed herein include, but are not limited to, small, free-flowing particles (typically, but not limited to, about 1 to about 3 inches in length, and of many different shapes) suitable for use as a packaging material which represents an alternative to expanded polystyrene particles commonly in use at the present time. Also included are single molded parts or forms suitable for packaging of electronic components and other items similar to and as a replacement for the polystyrene foam inserts which computers or other devices come packed in. Molded parts, organized bats or free-flowing particles suitable for thermal and/or acoustical insulation, including, but not limited to, housing (walls, attic, roofing structures, pipes and ductwork), vehicles such as sound deadening panels or foams, and aircraft and spacecraft exterior and interior insulation panels are able to be prepared. Articles suitable for providing barrier to gas or liquid permeation beyond that of a simple polymeric structure and can be used in a variety of packaging and storage devices are able to be prepared. Articles suitable for providing ballistic protection, suitable for use in individual body armor, as well has vehicular protection in land, water, or aeronautic forms of transportation can also be prepared. Additional articles include filters or products (pads, bats, and loose fills, etc.) used to absorb industrial, biological, chemical, agricultural wastes and other fluids. Other, low density polymeric structures in which the aerogel is present can be used to replace polymeric foams. Laminates including the aerogel are prepared in some embodiments.

According to one aspect of the present application, a method of forming an anisotropic porous material includes: forming an aerogel precursor, the aerogel precursor including a matrix material and a liquid dispersion medium for dispersing the matrix material; freezing the aerogel precursor so that the dispersion is solidified while controlling the direction of crystal growth within the aerogel precursor; and freeze drying the aerogel precursor to sublime the dispersion medium and form the porous material.

According to one embodiment, the direction of crystal growth is controlled using a mold that includes an area of low thermal conductivity and an area of high thermal conductivity.

According to another embodiment, the area of low thermal conductivity is located on the side of the mold and the area of high thermal conductivity is located on the bottom of the mold.

According to another embodiment, the crystal growth is controlled in the vertical direction with respect to the aerogel precursor.

According to another embodiment, the area of low thermal conductivity is located on the bottom of the mold and the area of high thermal conductivity is located on the side of the mold.

According to another embodiment, the crystal growth is controlled in the horizontal direction with respect to the aerogel precursor.

According to another embodiment, the area of high thermal conductivity is at least one conductive channel that passes through the bottom so as to be in fluid contact with the aerogel precursor.

According to another embodiment, the conductive channels may protrude slightly from the bottom of the mold.

According to another embodiment, the crystal growth is controlled such that the crystals nucleate from the at least one conductive channel.

According to another embodiment, the matrix material includes a polymeric material.

According to another embodiment, the matrix material includes a clay material.

According to another embodiment, the matrix material includes a plant-based material.

According to another embodiment, the method further includes curing the formed porous material.

According to another embodiment, the method further includes compressing the formed porous material.

According to another embodiment, the compression is performed in two directions.

According to one embodiment, freezing the aerogel precursor includes subjecting the aerogel precursor to a bath at a temperature ranging from about −1° C. to about −196° C. According to another embodiment, freezing the aerogel precursor includes subjecting the aerogel precursor to a bath at a temperature ranging from about −40° C. to about −196° C.

The foregoing and other features of the invention are hereinafter described in greater detail with reference to the accompanying drawings.

DESCRIPTION

Figure 1A:
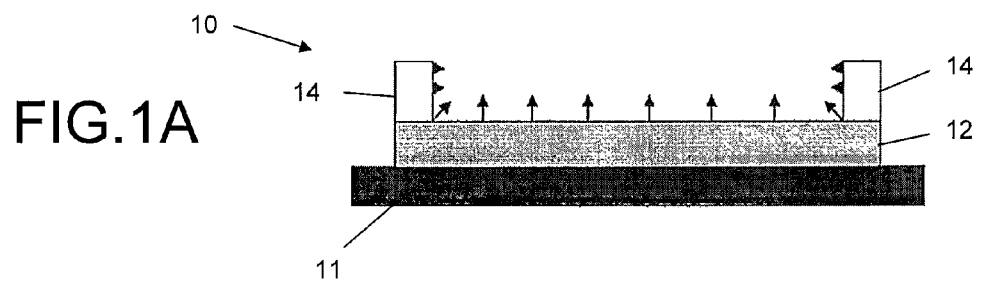
FIG. 1A is a schematic diagram of an exemplary mold having a thermally conductive bottom in accordance with the subject matter of the preset application.

Aerogels in accordance with the present application may be produced using various polymers, dispersions, clays, additives, fillers, fibers, etc. For example, aerogels in accordance with the present application may be polymer based. As such, an aerogel may be formed solely from one or more polymers in combination with a dispersion medium. In other embodiments, one or more clays, additives, fillers, fibers, etc the aerogel may be combined with the polymer and dispersion to form the aerogel.

As described herein, highly porous, aerogel like structures that include a three-dimensional, open-cell body may be formed using two-phase systems, including dispersions, emulsions, solutions, suspensions and latexes. A first phase, for example a polymer or polymer precursor, is dispersed, suspended or emulsified in a second phase, referred to herein as a dispersion medium, to form the two phase system, referred to herein as a dispersion. The dispersion is first subjected to freezing to solidify the dispersion medium, and then freeze dried to remove the bulk of the dispersion medium, leaving behind a solid, polymer containing skeleton of the dispersion. While these highly porous structures are not formed from a gel, the term "aerogel" as used herein includes these dispersion derived structures.

The polymer used in the aerogel may be one or more monomers, polymers, copolymers, or combinations thereof. As used herein, the term "polymer" may refer any of the described or similar monomers, polymers, copolymers, or combinations.

The polymer may include water soluble and/or non-water soluble polymers. Examples of water soluble polymers include, but are not limited to, natural polymers such as starches, plant gums, modified cellulosic and lignin materials, chitan, chitosan, pectin, and water soluble and dispersible proteins. Suitable starches comprise corn starch, potato starch, amaranth starch, arrowroot starch, banana starch, barley starch, cassava starch, millet starch, oat starch, rice starch, rye starch, sago starch, sorghum starch, sweet potato starch, wheat starch and yarn starch.

Water soluble polymers typically include polymers having one or more acidic groups per molecule, and those in which all of the acidic groups are combined as salts, or some of the acidic groups are combined as salts. The monomer system used for the preparing water soluble polymers typically includes any suitable combination of olefinically unsaturated monomers which is amenable to copolymerization, provided such a monomer system includes an acid-bearing comonomer(s) (preferably in sufficient concentration to render the resulting polymer fully or partially soluble in aqueous media), or a comonomer(s) bearing an acid-forming group which yields, or is subsequently convertible to, such an acid group (such as an anhydride, e.g. methacrylic anhydride or maleic anhydride, or an acid chloride) and also a comonomer(s) which imparts crosslinkability. Typically the acid-bearing comonomers are carboxyl-functional acrylic monomers or other ethylenically unsaturated carboxyl bearing monomers such as acrylic acid, methacrylic acid, itaconic acid and fumaric acid. Sulphonic acid-bearing monomers could also e.g. be used, such as styrene p-sulphonic acid (or correspondingly styrene p-sulphonyl chloride). An acid bearing monomer could be polymerised as the free acid or as a salt, e.g. the $NH_4$ or alkali metal salts of ethylmethacrylate-2-sulphonic acid or 2-acrylamido-2-methylpropane sulphonic acid, or the corresponding free acids. Other, non-acid functional non-crosslinking monomer(s) which may be copolymerized with the acid monomer(s) include acrylate and methacrylate esters and styrenes; also dienes such as 1,3-butadiene and isoprene, vinyl esters such as vinyl acetate, and vinyl alkanoates. Methacrylates include normal or branched alkyl esters of C1 to C12 alcohols and methacrylic acid, such as methyl methacrylate, ethyl methacrylate, and n-butyl methacrylate, and (typically C5 to C12) cycloalkyl methacrylates acid such as isobornyl methacrylate and cyclohexyl methacrylate. Acrylates include normal and branched alkyl esters of C1 to C12 alcohols and acrylic acid, such as methyl acrylate, ethyl acrylate, n-butyl acrylate, and 2-ethylhexyl acrylate, and (typically C5-C12) cycloalkyl acrylates such as isobornyl acrylate and cyclohexylacrylate. Styrenes include styrene itself and the various substituted styrenes, such as α-methyl styrene and t-butyl styrene. Nitriles such as acrylonitrile and methacrylonitrile may also be polymerised, as well as olefinically unsaturated halides such as vinyl chloride, vinylidene chloride and vinyl fluoride. Functional monomers which impart crosslinkability (crosslinking monomers for short) include epoxy (usually glycidyl) and hydroxyalkyl (typically C1-C12, e.g. hydroxyethyl)methacrylates and acrylates, as well as keto or aldehyde functional monomers such as acrolein, methacrolein and vinyl methyl ketone, the acetoacetoxy esters of hydroxyalkyl (typically C1-C12) acrylates and methacrylates such as acetoacetoxyethyl methacrylate and acrylate, and also keto-containing amides such as diacetone acrylamide. The purpose of using such functional monomer is to provide subsequent crosslinkability in the resulting polymer system.

Water insoluble polymers that may be used to form the aerogel may include those derived from at least one emulsion polymerized hydrophobic polymer. The monomer system employed for the formation of the hydrophobic polymer may include, for example, non-acid functional monomers, and in particular styrenes, such as styrene itself, $\alpha$-methylstyrene, o-, m- and p-methylstyrene, o-, m- and p-ethylstyrene, p-chlorostyrene and p-bromostyrene; normal and branched acrylic and methacrylic esters of alkanols (typically C1-C12) and cycloalkanols (typically C5-C12) such as methyl methacrylate, ethyl methacrylate, n-butyl methacrylate, t-butyl methacrylate, 2-ethylhexyl methacrylate, isobornyl methacrylate, and cyclohexyl acrylate and the corresponding acrylates; vinyl esters such as vinyl acetate and vinyl alkanoates; vinyl halides such as vinyl chloride; vinylidene halides such as vinylidene chloride; dienes such as 1,3-butadiene and isoprene. A functional monomer(s) for imparting crosslinkability (which is not normally an acid monomer) may optionally be included, examples of which include hydroxy and epoxy functional (meth)acrylates such as hydroxyalkyl (typically C1-C12) methacrylate, e.g. 2-hydroxyethyl methacrylate, glycidyl methacrylate, and the corresponding acrylates, as well as keto- and aldehyde-functional monomers such as acrolein, methacrolein, and methyl vinyl ketone, acetoacetoxy esters of hydroxyalkyl (typically C1-C12) acrylates and methacrylates such as acetoacetoxyethyl acrylate or methacrylate, and also keto or aldehyde-containing amides such as diacetone acrylamide.

Emulsifying agents that can be used for the emulsion polymerization of the water soluble polymer and/or water insoluble polymer are, for example, anionic and/or non-ionic emulsifiers. Anionic emulsifiers include, but are not limited to, alkylethoxylate sulfate and sulfonate, alkylphenolethoxylate sulfate and sulfonate, alkylsulfate and sulfonate, alkylethoxylate phosphates, alkylphenol ethoxylate phosphates, alkyl phosphates, alkylaryl sulfonates, sulfosuccinates, and mixtures thereof. Non-ionic surfactants include, but are not limited to, alkylaryl polyether alcohols, alkylphenol ethoxylates, alkyl ethoxylates, ethylene oxide block copolymers, propylene oxide block copolymers, polyethylene oxide sorbitan fatty acid esters, and mixtures thereof. In one embodiment, the amount of emulsifying agent used is between 0.3 to 2% by weight, based on the weight of the total amount of monomer. In another embodiment, the amount of emulsifying agent used is between 0.3 to 1% by weight.

The polymer may be combined and mixed with an aqueous dispersion medium so as to form a suspension, emulsion, dispersion or solution. The combination of the polymer and dispersion medium forms an aerogel precursor. In some embodiments, the aerogel precursor may also include one or more clays, additives, fillers, fibers, etc.

As used herein, the dispersion medium may be any suitable liquid compound or mixture of compounds that forms a crystalline phase structure when frozen and is sublimable. Examples of dispersion media include, but are not limited to, water, alcohols, such as tert-butanol, acid group containing solvents such as acetic acid, acetonitrile, dimethyl sulfoxide, cyclohexane, benzene, ortho, meta, or para-xylene, or a combination thereof. The dispersion medium may be a solvent that dissolves the polymers, copolymers, monomers, or combination thereof. For example, non-water soluble polymers may be dissolved in a suitable solvent appropriate for the polymer with examples including, but not limited to, alcohol such as methanol, ethanol, propanol, butanol, acid group containing solvents such as formic acid and acetic acid, formamide, acetone, tetrahydrofuran, methyl ethyl ketone, ethyl acetate, acetonitrile, N,N-dimethylformamide, dimethyl sulfoxide, hexane, toluene, benzene, ethers such as diethyl ether, methylene chloride, or carbon tetrachloride, etc.

The polymer may be combined and/or mixed with the dispersion medium in an amount from about 1 to about 40 wt % of the total polymer/dispersion medium mixture. In one embodiment, the polymer is combined and/or mixed with the dispersion medium in an amount from about 0.5 to about 30 wt %. In another embodiment, the polymer is combined and/or mixed with the dispersion medium in an amount from about 1 to about 10 wt %. Higher concentrations of polymer in the solution will generally produce robust structures, but will reduce the porosity and provide for higher densities.

When forming the aerogel by a suspension or emulsion, the polymers form the structure of the aerogel via binding forces. But in some embodiments, it may be difficult to form high Tg materials or relatively rigid particles such as polystyrene and polyethylene into the aerogel structures due to limited interactions between particles. The interaction between the polymers may be manipulated and creation of the ice template structure may be aided by addition of a low Tg material, such as natural rubber latex or synthetic SBR type rubber emulsion are useful for creating the ice template structure, as the latexes or emulsions are capable of coalescing during the freezing process.

In some embodiments, the aerogel is free of clay. In other embodiments, the aerogel may include one or more clays that are mixed with the polymer and dispersion medium prior to freeze drying. Clay is generally defined as a material containing a hydrated silicate of an element such as aluminum, iron, magnesium, potassium, hydrated alumina, iron oxide, or the like. The silicate layers of such clays are negatively charged, and are separated by layers of positively charged ions, such as sodium, potassium and other elements. While not specifically required for the present invention, naturally-occurring clays can be altered via ion exchange processes, to, for example, replace sodium ions with quaternary ammonium ions and utilized in the present invention. Occasionally, the clay may contain impurities of other naturally occurring minerals and elements that can vary depending on the location where the clay is obtained. The clays of interest for the present invention can be used as mined, or can be purified by methods known to those of ordinary skill in the art of clay product manufacture.

In one embodiment, the clays that may be utilized in the aerogel are capable of being exfoliated or subdivided into individual layers. In another embodiment, the clays that may be utilized in the aerogel are soluble or dispersible in solvents such as water to at least 1-5 wt %, Examples of suitable clays, include, but are not limited to, illite clays such as attapulgite, sepiolite, and allophone; smectite clays such as montmorillonite, bentonite, beidellite, nontronite, hectorite, saponite, and sauconite; kaolin clays such as kaolinite, dickite, nacrite, anauxite, and halloysite-endellite; and synthetic clays such as laponite and fluorohectorite.

When included, the clays may be present in an amount ranging from about 0.25 to about 10 wt % of the total weight of the polymer/dispersion medium/clay mixture. In one embodiment, the clays may be present in amount from about 0.25 to about 5 wt % of the total weight of the polymer/dispersion medium/clay mixture. In another embodiment, the clays may be present in amount from about 0.25 to about 2.5 wt % of the total weight of the polymer/dispersion medium/clay mixture.

U.S. Patent Application Publication Nos. 2007/0208124 and 2008/0132632 are herein incorporated by reference in their entirety and are generally directed to clay aerogels. As disclosed therein, the aerogel may be formed from clay and one or more polymers such that the formed aerogel may include about 1 to about 99 wt % of clay. In another embodiment, the clay may be present in an amount from about 1 to about 30 wt %. In yet another embodiment, the clay may be present in an amount from about 1 to about 10 wt %. In an embodiment only including polymer and a clay in a dispersant medium, the weight ratio of polymer to clay may range from 1:99 to about 99:1.

In those embodiments that include a clay, a water-soluble salt may be included in the mixture prior to freeze drying. Examples of suitable water soluble salts include those comprising mono-, di-, or tri-valent cations, including, but not limited to, Na, K, Li, H, Ca, Mg, and Al; and mono-, di-, or tri-valent anions, including, but not limited to, Cl, F, Br, O, S, $PO_4$, $SO_3$, $SO_4$, acetate, or benzoate, or combinations thereof. These salts are may be present in an amount from about 0.05 to about 20 wt % of the aerogel on a dry basis, depending on the specific solubility of said salts.

Additives useful to modify the properties of the aerogel may also be included in the aerogel. For example, additives such as colorants (dyes, pigments), antistatic agents, chemical coupling agents, electrically conductive-fillers including, but not limited to, forms of conductive carbon and metal flakes/particles; and photoactive species including, but not limited to, rare earth ions, may each be incorporated into the aerogel structures. In one embodiment, the additives may be included in an amount less than about 1 wt % of the aerogel structure. In another embodiment, the additives may be included in an amount less than about 0.1 wt %.

Filler such as, but not limited to, non-smectic clays, talc, mica, fluoromica, glass fibers, carbon fibers, and carbon nanotubes may also be incorporated in an amount up to about 50 wt % of the aerogel or aerogel component on a dry basis. In one embodiment, the filler may be included in an amount less than about 10 wt % of the aerogel. The amount of filler will depend on the particular aerogel composition.

In some embodiments, hydrophobic filler or additive materials may be added to the aerogel precursor by combining the hydrophobic filler with a hydrophilic polymer. A hydrophobic filler is normally not dispersible in the dispersion medium alone. However, the hydrophilic polymer effectively entraps the hydrophobic material in the aerogel precursor which may then be freeze dried to form the aerogel containing both hydrophilic polymer as well as the entrapped hydrophobic material. Accordingly, in one embodiment, an aerogel precursor may be created comprising the dispersion medium, a hydrophilic polymer, and a hydrophobic filler or additive material. The amounts of hydrophilic polymer and hydrophobic material independently can range from about 2 to about 50 wt %, and in some embodiments, may range from about 2.5 to about 10 wt % based on the total weight of the mixture. In one embodiment for example, 2.5 wt % of boron nitride may be incorporated into a PVOH solution via blending to create a dispersion that can be freeze-dried to create a three dimensional aerogel. As a separate example, boron nitride may be incorporated and 5 wt %.

In one embodiment, the aerogel includes one or more same or different fibers. The fibers may serve as a reinforcing agent that improves the structural integrity of the aerogels, and in some embodiments, may serve as a wicking material and aid in the uptake of fluid to the aerogel.

Fibers are generally threads or thread-like structures in discreet elongated pieces. Suitable fibers include both natural fibers and synthetic fibers. Natural fibers are those produced by plants, animals, or geological processes. For example, plant fibers include, but are not limited to, cotton, hemp, jute, flax, ramie and sisal. Wood fibers derived from tree sources are also included within the scope of the present invention, including processed and unprocessed wood fibers. Animal fibers generally consist of proteins such as, but not limited to, spider silk, sinew, catgut, wool and hair such as cashmere, tunicate whiskers, mohair and angora. Mineral fibers are derived from naturally occurring minerals and include for example asbestos, woolastinite, attapulgite and halloysite. Synthetic fibers can be formed from natural or synthetic materials. Glass fibers are an example and can be made as a further example from natural raw materials such as quartz. Metal or metal oxide fibers are also suitable and can, for example, be drawn from ductile metals such as copper, gold or silver, and extruded or deposited from metals considered brittle such as nickel, aluminum or iron, for example. Carbon fibers are often based on carbonized polymers. Polymer fibers can be made from any suitable polymer including, but not limited to, polyamides, polyesters, polyolefins, polyethers, polyurethanes, polyalcohols, polyelectrolytes, polyvinyl alcohol, polyacrylonitrile and polyvinyl chloride. Fibers also include coextruded fibers having two distinct polymers forming the fiber, such as a core-sheath fiber or side-by-side fiber. Fibers also can be coated if desired. For example, coated fibers exist such as nickel-coated fibers in order to prevent static elimination, silver-coated to provide anti-bacterial properties and aluminum-coated fibers. Industrial made fibers from natural materials include soy-based fibers known as SOYSILK®, and corn-based fibers such as INGEO®. In some embodiments, various fibers present in an aerogel component that is fired, such as some polymeric fibers, can carbonize and form an interpenetrating network of carbon fibers and ceramic structures.

Any suitable shape of fibers can be utilized. For example, the cross-sectional shape of the fibers may be one or a combination of a round, hollow, porous, oval, star, or trilobal shape. The fibers may be linear, curved, crimped, or the like and may be produced and/or utilized with or without added sizing agents or surface treatments. Furthermore, the amount of fibers and size of the fibers utilized depends upon the desired end properties of the aerogel. The fibers generally have a length ranging from about 1 μm to about 20 mm. In one embodiment, the fibers have a length from about 2 mm to about 10 mm. The fibers generally have a diameter ranging from about 20 nm to about 1 mm. In one embodiment, the fibers have a diameter from about 15 μm to 50 μm. The amount of fibers in the formed aerogel may range from about 2.5 to about 5000 parts based on 100 parts by weight of the polymer. In one embodiment, the amount of fibers in the formed aerogel may range from about 10 to about 100 parts by weight.

The aerogel may also be formed from bio-based matter, such as a plant-based matter. Plant-based matter includes, for example, seeds such as rice and corn, and fruit matter such as pectin. In other embodiments, animal-proteins may be utilized, such as casein. Suitable bio-based matter includes a water soluble portion such as a plant starch, plant protein, animal protein, or a combination of two or more such polymeric substances, as well as a water insoluble portion of the material, such as cellulose that is considered filler. In some embodiments, additional materials such as carbohydrates, polysaccharides, chitosan, alginate, and guar gum may be utilized.

The aerogels in accordance with the present application may be formed by subjecting an aerogel precursor (e.g., the mixture of polymer, dispersant medium, and/or one or more clays, fillers, additives, etc.) to at least one freeze-thaw process. The aerogel precursor is then subjected to a freeze drying procedure that causes the liquid component of the dispersion to be removed while leaving the solid structure of the aerogel intact.

Specifically, a polymer, copolymer, monomer, or combination thereof may be combined with a sufficient amount of a liquid dispersion medium to form an aerogel precursor. One or more of additives such as a clay, salt, additive, filler, or fiber may be combined and/or mixed with the polymer at any period of time prior to addition of the polymer to the dispersion medium, at a time subsequent the combination of the polymer and dispersion medium, or at both times. Hence, the precursor matrix may include a liquid dispersion medium and a matrix material that includes polymer and one or more of a clay, salt, additive, filler, or fiber.

The aerogel precursor is mixed for a period of time generally until the polymer is sufficiently suspended or dissolved in the dispersion medium. Mixing may be performed by any suitable means, such as blending and shearing, for any suitable period of time until desired suspension is achieved. For example, the duration of the mixing process may range from about 1 minute to about 120 minutes, and the mixing process may yields a homogeneous or substantially homogenous mixture. In one embodiment, the dispersion medium may be heated to increase solubility of the polymer and/or additives.

The aerogel precursor is poured or otherwise transferred into a mold. Although in some embodiments the aerogel precursor may be mixed in the mold. The mold in accordance with the present application allows for the direction of the crystal growth to be controlled. Such control may assist in predicting the properties of the material, for example, by directing layer orientation.

The aerogel precursor is subsequently frozen, for example in a solid carbon dioxide and ethanol bath. In another embodiment, the gel is frozen utilizing liquid nitrogen, although the liquid nitrogen does not contact the mixture. More specifically, the liquid dispersion medium is frozen (or solidified) and forms a crystalline phase when frozen. In one embodiment, the aerogel precursor is subjected to temperatures within the range of about $-1°$ C. to about $-196°$ C. In another embodiment, the aerogel precursor is subjected to temperatures within the range of about $-40°$ C. to about $-196°$ C. In yet another embodiment, the aerogel precursor is subjected to temperatures within the range of about $-60°$ C. to about $-100°$ C. In one embodiment, the aerogel precursor is subjected to temperatures of about $-60°$ C. In another embodiment, the aerogel precursor is subject to temperatures of about $-10°$ C.

In general, crystal growth of the dispersion medium will contribute to the formation of the aerogel structure. As discussed herein, such process is also referred to as a cryostructuring process. When the precursor matrix including dissolved polymer and/or dispersed particles is frozen, the dissolved polymer and/or dispersed particles will be excluded from the growing crystals. The dissolved polymer and/or dispersed particles may interact with one another and thereby form the aerogel structure. In those embodiments where only a polymer is included in the dispersion medium, the binding forces of the polymer will maintain the formed structure. In those embodiments where a clay, filler, additive, fiber, etc. are included, the polymer will act as a binder for the included components. Although, the clay may also possess binding capabilities.

In order to grow the ice crystals in various directions, the molds in accordance with the present application may include areas of low thermal conductivity and areas of high thermal conductivity. An example of a low thermal conductivity material suitable for use in the areas of the mold in which ice growth is to be limited is polypropylene. An example of a high thermal conductivity material suitable for use in the thermally conducting areas of the mold is MIC 6® cast aluminum plate, which possesses good stability during thermal cycling.

Figure 1B:
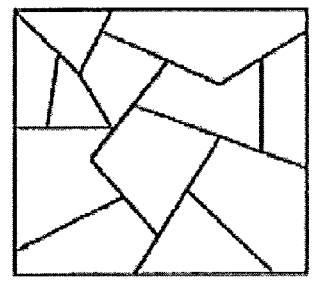
FIG. 1B is a schematic diagram of an exemplary frozen aerogel precursor produced using the mold of FIG. 1A.
Figure 1C:
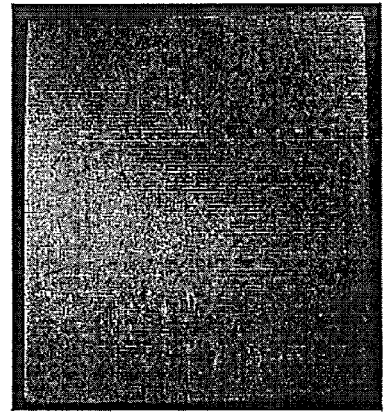
FIG. 1C is a photograph of an exemplary frozen aerogel precursor produced using the mold of FIG. 1A.
Figure 2A:
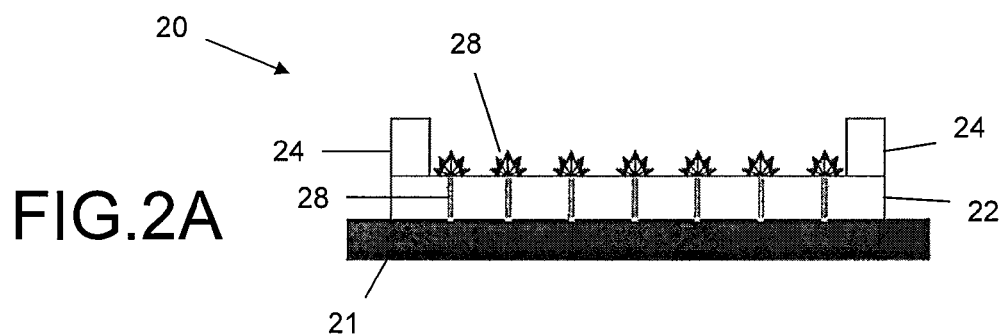
FIG. 2A is a schematic diagram of an exemplary mold having thermally conductive channels the bottom in accordance with the subject matter of the preset application.
Figure 3A:
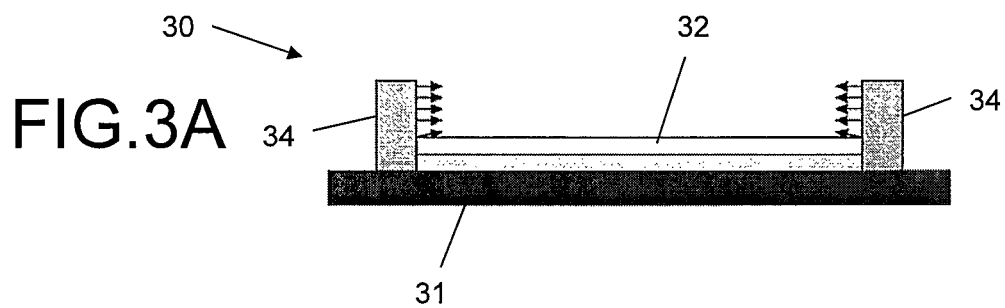
FIG. 3A is a schematic diagram of an exemplary mold having thermally conductive sides in accordance with the subject matter of the preset application.

FIGS. 1A, 2A, and 3A illustrate exemplary molds 10, 20, 30 suitable for directing layer orientation in accordance with the present application. In one embodiment, the molds 10, 20, and 30 may be at least partially submersible in a bath 11, 21, and 31. The arrows depict the direction of ice growth, thereby controlling the alignment of the layers in materials which exhibit a lamellar structure. As the crystals form, they will compete for material when growing near each other and therefore create grain boundaries when they meet. As illustrated in FIG. 1A, the mold 10 may have a thermally conducting bottom 12 and insulating sides 14 and the aerogel precursor may be frozen from the thermally conducting bottom portion 12. The layers formed in this embodiment may be considered vertical layers, as they are generally vertically oriented. A schematic view of an aerogel precursor that has been frozen by the mold design of FIG. 1A is illustrated in FIG. 1B. Furthermore, FIG. 1C is a photograph of an exemplary aerogel precursor obtained from the mold design of FIG. 1A. A formed aerogel in accordance with such an embodiment may be used as an insulating material, while providing a path for moisture to escape (e.g., a pipe insulation).

Figure 2B:
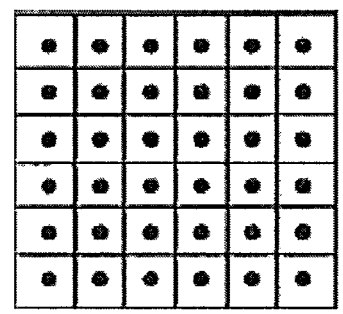
FIG. 2B is a schematic diagram of an exemplary frozen aerogel precursor produced using the mold of FIG. 2A.
Figure 2C:
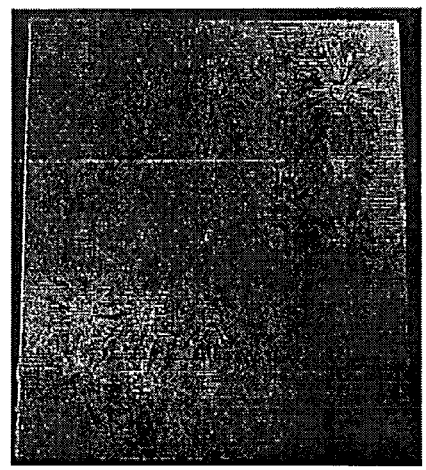
FIG. 2C is a photograph of an exemplary frozen aerogel precursor produced using the mold of FIG. 2A.

In another embodiment, illustrated in FIG. 2A, the mold 20 includes conductive channels 26 that pass through the bottom 22 so as to be in fluid contact with the aerogel precursor. In some embodiments, the conductive channels 26 may protrude slightly from the bottom 22 of the mold 20. In this embodiment, the bottom 22 of the mold 20 is an insulating material. The sides 24 are also constructed of an insulating material. In such an embodiment, ice growth nucleates at the tips 38 of the channels 26. The layers formed in this embodiment extend from the controlled nucleation points. A schematic view of an aerogel precursor that has been frozen by the mold design of FIG. 2A is illustrated in FIG. 2B. Furthermore, FIG. 2C is a photograph of an exemplary aerogel precursor obtained from the mold design of FIG. 2A.

Figure 3B:
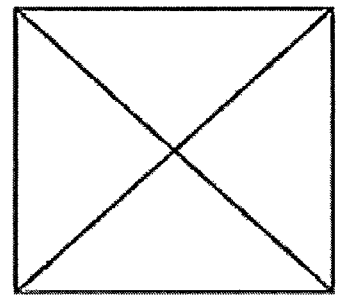
FIG. 3B is a schematic diagram of an exemplary frozen aerogel precursor produced using the mold of FIG. 3A.
Figure 3C:
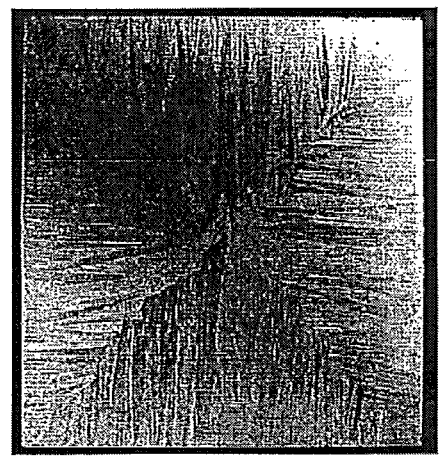
FIG. 3C is a photograph of an exemplary frozen aerogel precursor produced using the mold of FIG. 3A.

In yet another embodiment, as illustrated in FIG. 3A, the mold 30 includes thermally conducting sides 34 and an insulating bottom 32. Of course, the embodiment of FIG. 3A may be modified such that it includes conductive channels that pass through one or more sides of the mold, similar to the embodiment illustrated in FIG. 2A. The layers formed in this embodiment may be considered horizontal layers, as they are generally horizontally oriented. A schematic view of an aerogel precursor that has been frozen by the mold design of FIG. 3A is illustrated in FIG. 3B. Furthermore, FIG. 3C is a photograph of an exemplary aerogel precursor obtained from the mold design of FIG. 3A. A formed aerogel in accordance with such an embodiment may possess better insulating properties when compared to the same aerogel formed having vertical layers, as heat would tend to flow with the layers in the horizontal direction.

Figure 4:
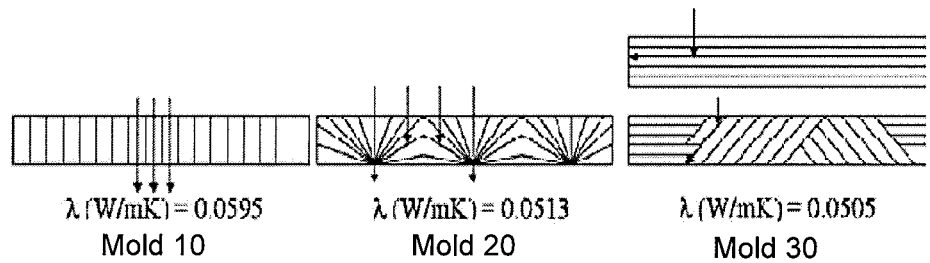
FIG. 4 is a schematic diagram energy flow through the cross-section of the aerogels that have been formed using the molds of FIGS. 1A, 2A and 3A.

FIG. 4 generally illustrates energy flow through the cross-section of the aerogels that have been formed using the molds of FIGS. 1A, 2A and 3A.

Subsequent to the directional freezing process, the aerogel precursor is dried under vacuum (i.e., freeze-dried) and the dispersion medium is sublimed. The formed aerogel may then removed from the mold.

The aerogel may optionally be oven cured while under vacuum, either prior to or subsequent to the aerogel being removed from the mold. In the curing process, the aerogels are generally heated to a temperature ranging from about 150° C. to about 1200° C. for any suitable period of time. In embodiments where the aerogel includes a clay, the curing process may yield a ceramic-like aerogel structure. The cured aerogel structures remain low density, are mechanically resilient, easily handled, and stable to high temperatures of use. However, the cured aerogel may possess dimensions that are slightly smaller and densities which are generally higher when compared to the uncured aerogel.

Figure 5A:
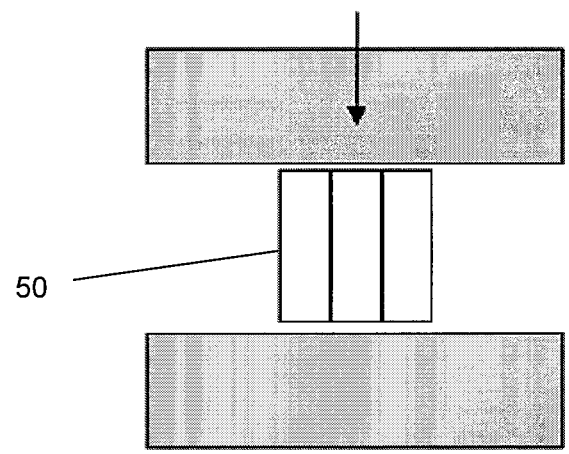
FIGS. 5A and B are schematic diagrams of anisotropic aerogel samples in accordance with the subject matter of the present application.
Figure 5B:
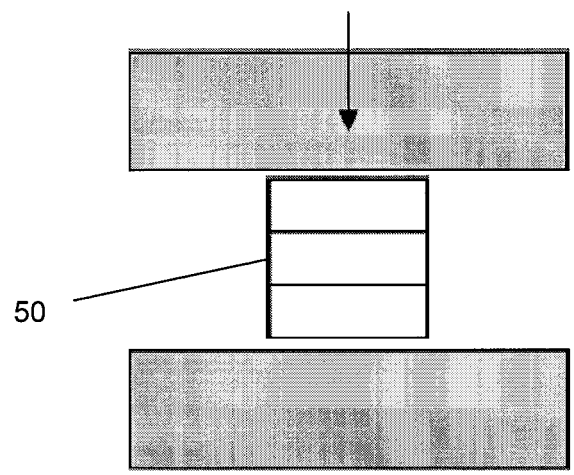

A material is described as anisotropic if the properties differ with respect to orientation of the sample. Anisotropy is useful in creating a range of products, from piezoelectrics to energy absorbing panels. Using the directional freezing methods described above, it is possible to create highly anisotropic materials. Controlling the freezing process allows for creation of anisotropic materials having large dimensions in two directions. The different orientations of the formed layers results in variation of the aerogel properties. In one example, anisotropic materials were prepared by mixing 5 wt % PVOH solutions of varying molecular weight with the 10 wt % clay gels and freezing them in a vertical manner followed by drying. Cubic samples 50 were cut from the inner portions of the vertically oriented samples so as to eliminate any effect the edge may have on freezing. The cubic samples 50 were compression tested in two orientations, illustrated in FIGS. 5A and 5B.

Figure 6:
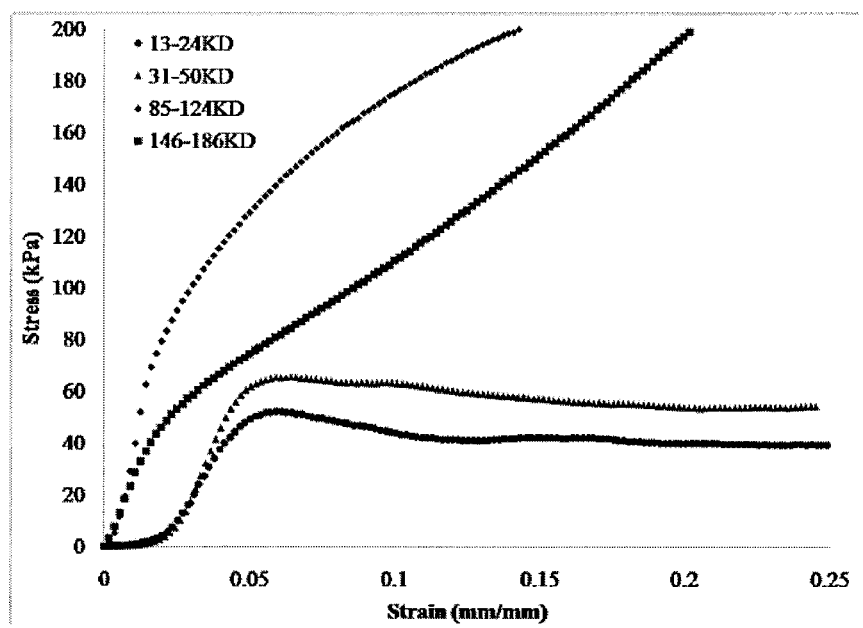
FIGS. 6-8 are charts illustrating compression testing results of the anisotropic aerogel samples of FIGS. 5A and B.
Figure 7:
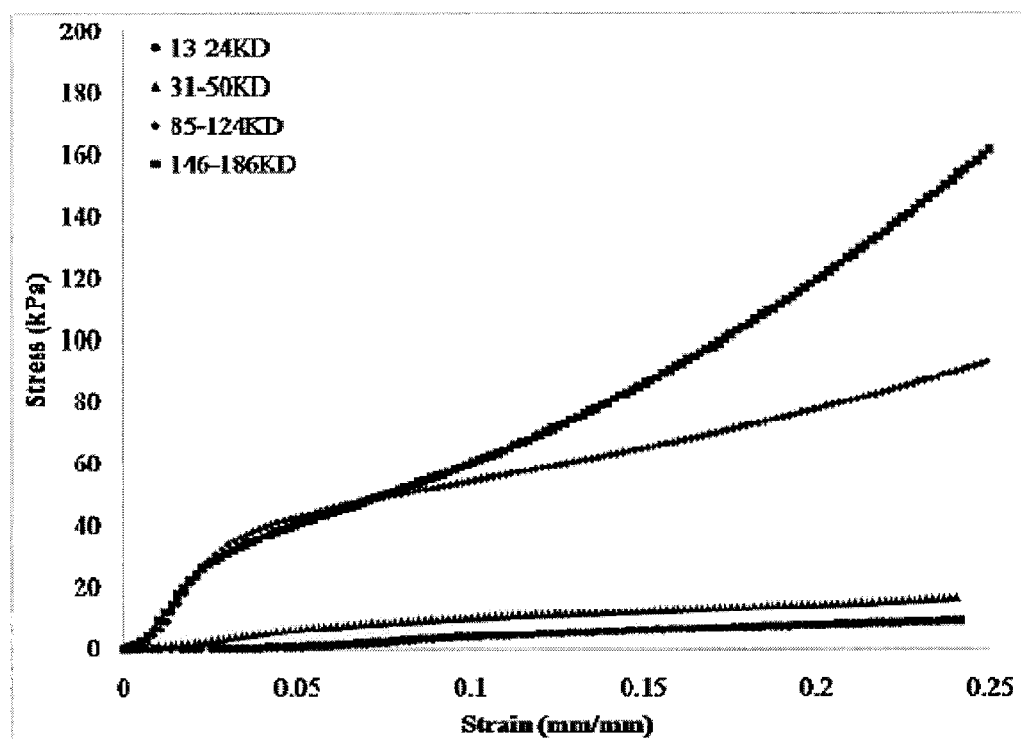
Figure 8:
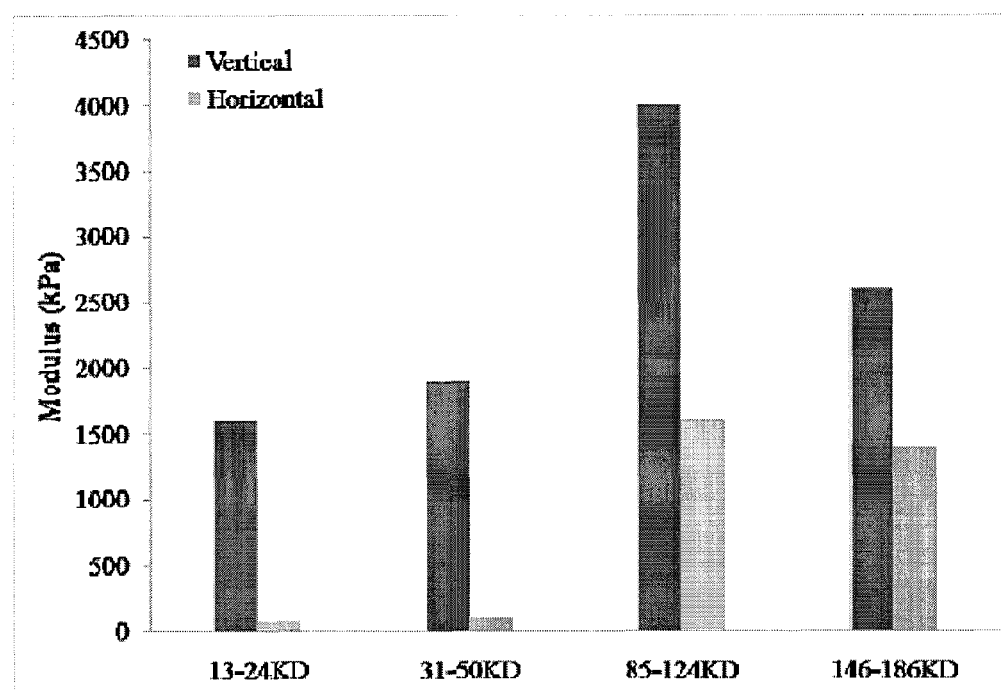

FIG. 6 illustrates the samples compressed in the vertical direction. The two lower molecular weight samples (13-24 KD and 31-50 KD) failed by abrupt layer buckling. The higher molecular weight structures (85-124 KD and 146-186 KD) did not fail in the same manner. FIG. 7 illustrates the samples compressed in the horizontal direction. The two lower molecular weight samples (13-24 KD and 31-50 KD) showed a more gradual yielding. The higher molecular weight structures (85-124 KD and 146-186 KD) did not fail in the same manner. To quantify the anisotropy, the modulus in the vertical direction is compared to that in the horizontal direction. As illustrated in FIG. 8, the samples exhibited anisotropic behavior at all molecular weights, but more significantly at the lower weights (24× and 19× at lower molecular weights, 3× and 2× at higher molecular weights).

Figure 9:
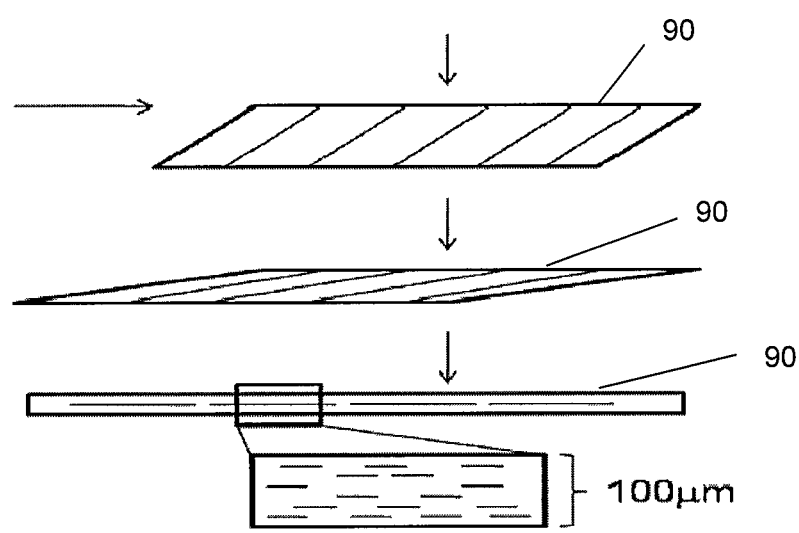
FIG. 9 is a schematic diagram of an exemplary compression procedure in accordance with the subject matter of the present application.

Those aerogels formed using the vertical controlled freezing mold (i.e., FIG. 1A) may be further processed by compression so as to create a continuous film that may act as a barrier material. More specifically, and with reference to FIG. 9, the formed aerogel 90 may be compressed using both a vertical and horizontal motion. The combination of pushing the material in two directions (vertical and horizontal) orients the layers while helping to push the air out of the aerogel 90 prior to entrapment of the air within compressed structure. In one embodiment, the compression may include hot pressing the aerogel. Barrier films for by such a process may be useful in a variety of applications. For example, such barrier materials may be used in packaging, especially in the food and transportation industries. Other applications include use in, for example, balloons, tires, and personal protective equipment.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method of forming an anisotropic porous material, including:
   forming an aerogel precursor, the aerogel precursor including a matrix material and a liquid dispersion medium for dispersing the matrix material;
   providing a mold having a bottom, at least one side, and an open top opposed the bottom, the mold comprising:
      an area of low thermal conductivity located on the bottom of the mold and an area of high thermal conductivity located on the at least one side of the mold, the area of high thermal conductivity having a higher thermal conductivity than the area of low thermal conductivity; or
      a plurality of conductive channels of high thermal conductivity that pass through the bottom having low thermal conductivity so as to be in fluid contact with the aerogel precursor, the conductive channels of high thermal conductivity having a higher thermal conductivity than the bottom having the low thermal conductivity;
   freezing the aerogel precursor within the mold so that the dispersion is solidified while controlling the direction of crystal growth within the aerogel precursor; and
   freeze drying the aerogel precursor to sublime the dispersion medium and form the porous material.

2. The method of claim 1, wherein the mold comprises the area of low thermal conductivity located on the bottom of the mold and the area of high thermal conductivity located on the at least one side of the mold.

3. The method of claim 2, wherein the crystal growth is controlled in the horizontal direction with respect to the aerogel precursor.

4. The method of claim 1, wherein the mold comprises the plurality of conductive channels of high thermal conductivity that passes through the bottom having low thermal conductivity so as to be in fluid contact with the aerogel precursor.

5. The method of claim 4, wherein the conductive channels protrude from the bottom of the mold.

6. The method of claim 4, wherein the plurality conductive channels are nucleation points for crystal growth.

7. The method of claim 1, wherein the matrix material includes a polymeric material.

8. The method of claim 7, wherein the matrix material includes a clay material.

9. The method of claim 1, wherein the matrix material includes a plant-based material.

10. The method of claim 1, further including curing the formed porous material.

11. The method of claim 1, further including compressing the formed porous material.

12. The method of claim 11, wherein the compression is performed in two directions.

13. The method of claim 1, wherein freezing the aerogel precursor includes subjecting the aerogel precursor to a bath at a temperature ranging from about −1° C. to about −196° C.

14. The method of claim 1, wherein freezing the aerogel precursor includes subjecting the aerogel precursor to a bath at a temperature ranging from about −40° C. to about −196° C.

15. The method of claim 1, wherein the area of low thermal conductivity comprises polypropylene and the area of high thermal conductivity material comprises aluminum.

16. The method of claim 1, wherein:
- the bottom of the mold defines a first dimension of the mold;
- the at least one side of the mold defines a second dimension of the mold oriented perpendicular to the first dimension; and
- the first dimension is greater than the second dimension.

\* \* \* \* \*